June 24, 1930.　　J. S. FRASER　　1,767,661
MUD GUN
Original Filed May 8, 1929
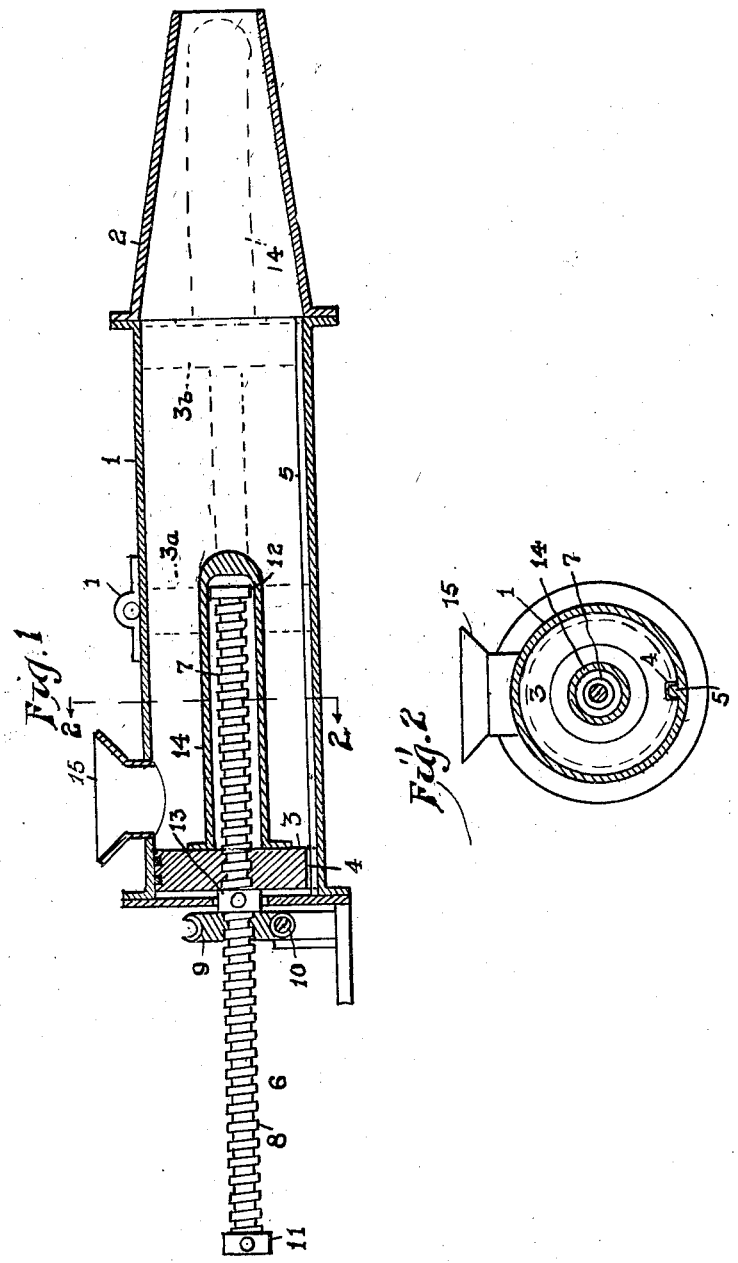
INVENTOR
J. S. Fraser
by F. N. Barber
attorney Patented June 24, 1930

1,767,661

UNITED STATES PATENT OFFICE

JAMES S. FRASER, OF WARREN, OHIO

MUD GUN

Original application filed May 8, 1929, Serial No. 361,319. Divided and this application filed September 30, 1929. Serial No. 396,309.

This invention relates to mud guns for stopping the tapping holes of blast furnaces and the like.

One object of this invention is to provide the piston of a mud gun with a comparatively short travel within the cylinder. Another object is to provide a shield for the parts of the mud gun which travels in front of the piston.

Referring to the accompanying drawing Fig. 1 shows a central longitudinal section of a mud gun provided with my invention, portions of the view being in side elevation, and Fig. 2 is a transverse section on the line 2—2 on Fig. 1.

Referring to the drawing, 1 designates the cylinder of the mud gun and 2 the nozzle attached to the forward end of the cylinder. The piston 3 has travel longitudinally in the cylinder and is prevented from rotation by means of the notch 4 therein which receives the stationary guide strip 5 secured to the bottom of the cylinder. 6 designates a traveling member having the threaded portion 7 within the cylinder 1 and the threaded portion 8 without the cylinder, the rotary device 9 is in the form of a nut in which the threaded portion 8 works. The rotary device 9 is also a worm-wheel operated by the drive-worm 10. The traveling member 6 has the flanges or collars 11 and 12. It also has the fixed collar or flange 13 intermediate between its ends and between the piston 3 and the rotary device 9. The parts being as shown the worm 10 is caused to rotate the rotary device 9. Assuming that the traveling member 6 does not at first rotate, the traveling member and the piston with its shield 14, which incloses the threaded portion 7 and is secured to the piston, will travel to the right until the piston reaches the position 3ª. Just at that time the flange 11 engages the rotary device 9 so that the two are clutched together and caused to rotate as a unit. Thereafter the piston will travel on the threaded portion 7 from the position 3ª to the position 3ᵇ. By rotating the rotary device in the opposite direction and assuming that the traveling member does not at first rotate, the piston and the member 6 will travel until the piston reaches the position 3ª. At this time the flange 13 engages the rotary device 9 so that thereafter the traveling member 6 and the rotary device 9 rotate as a unit, causing the piston to travel to the left on the threaded portion to the position shown in full lines.

Assuming that the parts are as shown and that at first the traveling member 6 rotates with the rotary device 9, the piston 3 will be fed along the threaded portion 7 until it reaches the flange 12 and the piston reaches the position 3ª. As the piston cannot further rotate, the member 6 cannot rotate any longer and therefore the rotary device 9 feeds the piston to the right from the position 3ª to the position 3ᵇ.

Assuming that during the first part of the return movement of the piston the rotary device 9 causes the rotation of the member 6, the piston will be fed along the threaded portion 7 until it reaches the flange 13. Thereafter the member 6 cannot rotate and the rotary device causes the piston and the member 6 to travel as a unit to the left until the parts reach the position shown in full lines.

This application is a division of my application Serial No. 361,319, filed May 8, 1929.

15 is a hopper through which mud is fed to the interior of the cylinder 1 in advance of the piston 3 and 16 is an eye to receive a hook or the like supported by a suitable hoisting device.

I claim:

1. In a mud gun, a traveling member having two threaded portions, a non-rotary piston having threaded connection with one portion, a cylinder in which the piston is reciprocable, a rotary device having threaded connection with the other threaded portion of the said member, means for rotating the said device, and means for clutching the said traveling member to the rotary device at the limit of travel of the said member in either direction, and for clutching the piston to the traveling member at the limit of travel of the piston in either direction.

2. In a mud gun, a traveling member having two threaded portions, a non-rotary piston having threaded connection with one portion, a cylinder in which the piston is reciprocable, a rotary device having threaded connection with the other threaded portion of the said member, means for rotating the said device, and means for clutching the said traveling member to the rotary device at the limit of travel of the said member in either direction, and means for causing the traveling member and the rotary device to be clutched together during a portion of the travel of the piston, whereby the traveling member may be rotated to feed the piston therealong, the said member and the said device being unclutched during the remainder of the travel of the piston.

In testimony whereof, I hereunto affix my signature.

JAMES S. FRASER.